Sept. 6, 1960     N. E. DELFEL     2,951,785
METHOD FOR CONTROL OF FUNGUS DISEASE ON PLANTS
Filed April 28, 1958
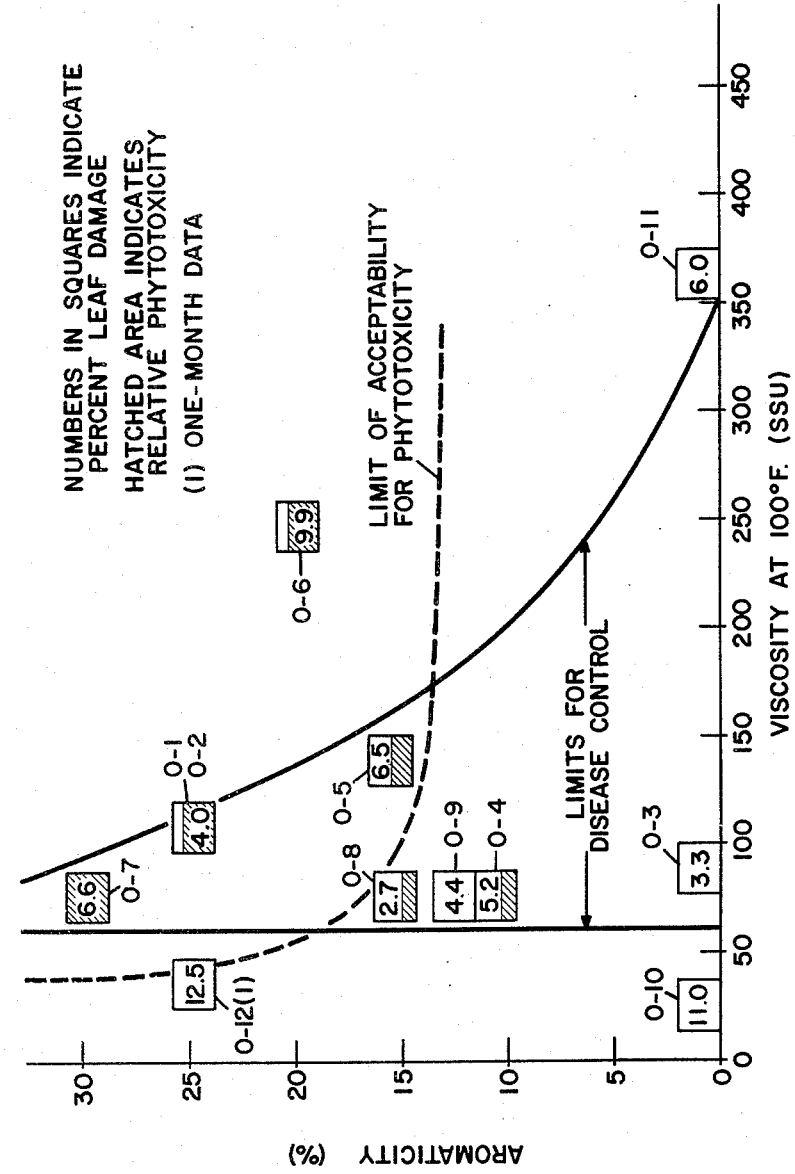
Norman E. Delfel     Inventor
By *S. Stahl*
Attorney

2,951,785
METHOD FOR CONTROL OF FUNGUS DISEASE ON PLANTS

Norman E. Delfel, Scotch Plains, N.J., assignor to Esso Research and Engineering Company, a corporation of Delaware Filed Apr. 28, 1958, Ser. No. 731,392

7 Claims. (Cl. 167—28)

This invention relates to novel spray oil compositions and the process of inhibiting fungus growth on plants. More specifically, this invention relates to the control of Sigatoka fungus disease in banana plantations.

The Sigatoka fungus disease of the banana plant originated in the islands of the South Pacific some fifty years ago. Since then it has spread throughout the banana producing world reaching the Caribbean area in the early thirties. Its control is considered essential for the successful production of bananas. For many years a Bordeaux mixture comprising copper sulfate, lime, sticking agent and water, applied at 200 gallons per acre every two weeks, has been the standard method of control. More recently within the past few years, attempts to develop certain oils which could be sprayed on to the plant for the control of the Sigatoka disease have been made. It has now been found that a mineral oil of certain defined properties and composition is an exceptionally superior fungicide which is effective on the banana plant against the Sigatoka disease. The particular oils of this invention may also be sprayed on peach trees to control the peach canker disease, on apple trees to control the apple scab and on coffee plants for the control of American leaf spot. These plants are merely typical of those which may benefit from the present spray oils. The specific oil composition of this invention not only is effective for long periods of time, but has an extremely low level of phytotoxicity which is an important factor for the commercial success of banana plantations. For example, among the oils tested, many were found to cause leaf yellowing or burning apparently due to components generally found in ordinary mineral oil compositions. It has been found that an oil spray composition to be effective for the specific use intended must meet certain requirements of viscosity, volatility, spreading tendency, oxidation stability, light absorption and the like.

The most effective method of applying the oil to the plant is to employ any conventional spray apparatus. Preferably the spray is a fine mist or fog which will uniformly cover the plant leaves. A convenient technique comprises employing a helicopter from which the mist of fog is ejected over the plantation or orchard.

Although this invention is directed primarily to the use of the specific spray oil compositions, it is to be understood that this invention does not exclude the use of additives which may provide added beneficial results beyond those effected by the spray oil composition per se. As further examples of additives which may be employed, there may be included oxidation inhibitors, oil thickeners, plant hormones, light absorbers, and even additional fungicides if desired. However, the oil spray of this invention is not effective as an emulsion.

It has been found that mineral oil compositions in order to meet the requirements set forth above and in order to effectively control the Sigatoka disease without causing harm to the banana plants must have a certain percentage of aromaticity with respect to specified viscosities. Further, a predominant portion of the oil composition must boil within a specified range, i.e. preferably 300–500° F. at 10 mm. of Hg.

In accordance with this invention the mineral oil composition is a light petroleum oil which has been modified to meet the following requirements. The viscosity of the banana spray oil must fall between about 50 and 175 SSU at 100° F., preferably 70–120 SSU at 100° F. Additionally, the banana spray oil must have an aromatics content below about 15% by weight.

This invention is not concerned with the particular techniques for the production of an oil meeting the above requirements since they are well known in the petroleum refining art. More specifically, the aromatics content of a hydrocarbon oil is easily lowered by such means as treatment with sulfuric acid, phenol extraction and the like. Viscosity, on the other hand, is controlled by numerous means including control of boiling range, dewaxing operations and processes for controlling the ratio of naphthenes to paraffins to aromatics. It is also preferable to maintain the olefinic content below about 2%. Higher percentages of olefinic compounds result in an unstable product which is subject to oxidation which may result in damage to the plants. The banana spray oil composition of this invention is effective when applied in an amount of from 0.25 to 4 and preferably 0.75–2 gallons of oil per acre of banana plants, although smaller or larger amounts may be employed depending on the particular circumstances, e.g. number of plants in an acre, weather conditions, etc. Typically, there are about 350 to 1000 banana plants per acre. The oils are applied by a blanketing technique so that the same amount of oil would generally be applied to a 350 plant acre as a 1000 plant acre.

To demonstrate the effectiveness of the banana spray oil compositions of this invention, a series of tests were carried out in Jamaica with a large number of banana plants. The test conditions were as follows. For the purpose of evaluating a large number of oils, the initial tests were carried out by what will be termed a "tent" technique. Each banana plant was enclosed in a portable tent about 12 feet high by 9 feet square for the purpose of confining the spray to the particular plant. The plant was then sprayed with the test oil in an amount equivalent to a field application rate of 2 gallons per acre. Subsequent to the spraying, the portable tent was removed thus permitting the banana plant to be exposed to ordinary weather conditions and to any fungus infection of the neighboring banana plants. By this technique a series of 12 different oils were tested. For the spraying operation a mist sprayer was utilized depositing the oil in the prescribed amounts on the plant as a fine mist. For this series of tests, spraying was repeated every two weeks for a two-month period and the data recorded in the following table. Each specific oil was tested on five trees, the trees being selected in a random fashion within the test area. In all a total of about 60 banana plants were involved in this initial test. The particular location of the test site represented an area where the Sigatoka infection is especially difficult to control even in dry weather due to the heavy dews and frequent fogs. Phytotoxicity is also severe in this location because the plants are not irrigated and because the soil is semi-infertile.

Table I sets forth the oils employed in the test with their physical and chemical properties. Table II sets forth the results of the tests, and for a graphical representation of these results, reference may be had to the drawing.

Table 1

| Test Oils | O-1 | O-2 | O-3¹ | O-4¹ | O-5 | O-6 | O-7 | O-8¹ | O-9¹ | O-10 | O-11 | O-12 |
|---|---|---|---|---|---|---|---|---|---|---|---|---|
| Specific Gravity | 0.8822 | 0.885 | 0.8514 | 0.849 | 0.865 | 0.8745 | 0.8990 | 0.8794 | 0.8745 | 0.788 | 0.8838 | 0.8289 |
| Viscosity, 100° F | 106.50 | 110 | 88.53 | 74.03 | 140.20 | 248.10 | 81.23 | 76.66 | 75.86 | 32 | 365.5 | 36.6 |
| Neutralization Number | 0.01 | 0.01 | 0.01 | 0.01 | 0.01 | 0.03 | 0.01 | 0.02 | 0.01 | 0.01 | 0.01 | 0.01 |
| Sulfur | 0.27 | 0.37 | <0.05 | 0.11 | 0.17 | 0.27 | <0.05 | <0.05 | <0.05 | 0.05 | <0.05 | 0.17 |
| Aniline Point | 194.5 | 190.0 | 222.0 | 210.5 | 224.5 | 227.0 | 163.5 | 186.0 | 191.0 | 183.0 | 234.0 | 173.4 |
| Aromatics, wt. percent | 25 | 25 | 1 | 12 | 16 | 20 | 29 | 15 | 12.0 | Approx. 7 | 0.8 | Approx. 22 |
|  |  |  |  |  |  |  |  |  |  | Atmos. |  | Atmos. |
| Vacuum Engler (10 mm.): |  |  |  |  |  |  |  |  |  |  |  |  |
| IBP, °F | 330 | 350 | 324 | 382 | 426 | 392 | 292 | 286 | 310 | 402 | 360 | 350 |
| 10% | 364 | 400 | 404 | 414 | 460 | 466 | 338 | 336 | 354 | 419 | 478 | 430 |
| 30% | 403 | 424 | 426 | 423 | 476 | 522 | 370 | 366 | 380 | 430 | 512 | 475 |
| 50% | 449 | 439 | 448 | 430 | 484 | 556 | 392 | 390 | 402 | 441 | 532 | 519 |
| 70% | 481 | 458 | 470 | 446 | 494 | 586 | 414 | 418 | 422 | 452 | 550 | 570 |
| 90% | 524 | 490 | 506 | 466 | 518 | 628 | 445 | 452 | 452 | 468 | 586 | 629 |
| 100% | 556 | 521 | 548 | 493 | 544 | Cracked | 488 | 490 | 492 | 477 | 638 | 683 |

¹ Spray oils within the scope of this invention.

Table II

| Spray Oil | Percent Leaf Area Infected By Sigatoka Fungus (First Eight Leaves) | Phytotoxicity Approximate Percentage Based on Phytotoxicity With O-7 as 100% |
|---|---|---|
| None (control) | 19.7 | |
| O-1 | } 4.0 | 70-75 |
| O-2 |  | |
| O-3 | 3.3 | 0 |
| O-4 | 5.2 | 30 |
| O-5 | 6.5 | 45 |
| O-6 | 9.9 | 70-75 |
| O-7 | 6.6 | 100 |
| O-8 | 2.7 | 25 |
| O-9 | 4.4 | 0 |
| O-10 | 11 | 0 |
| O-11 | 6 | 0 |
| O-12 | 12.5 | 0 |

To meet the minimum requirements of a good banana spray oil, the percent of leaf area infected (averaged for entire plant) must be maintained below about 5 and the phytotoxicity with spray oil O-7 as a reference must be maintained below about 30%. As the plant grows, new leaves appear at the top which are free from fungus damage and the older lower leaves die. The lower leaves generally have a higher percentage of fungus damage. It will be seen that only O-8, O-9, O-4 and O-3 oils fall within the subscribed range. Although certain oils such as O-1 have relatively low percentage numbers for the leaf area infection, they exhibit high phytotoxic effects and are therefore unacceptable. Certain oils such as O-10 and O-11 have no phytotoxic effect; however, their ability to control the fungus growth is moderately poor as compared to the oil compositions of this invention. The drawing shows the various oils plotting aromatics content against viscosity. Each oil is designated as a square. The number within the square represents the leaf area effected by Sigatoka fungus on the first eight leaves, and the hatched area represents the phytotoxicity relative to O-7.

Additionally, full scale field tests were carried out with O-1, O-4, O-5 and O-9 as follows. Four different test plots of 8 to 10 acres each at four different locations on the island of Jamaica were employed. This was to provide data under a variety of growing conditions. Each location was subdivided into four two-acre sections, one for each of the oils. Spraying began in early November at the rate of about 1.25 gallons per acre with the various oils, and the plants were resprayed every two weeks through January. While these tests have not been completed, mid-point inspections show the banana spray oil compositions within the scope of this invention are far superior to other oils with regard to disease control and phytotoxicity.

What is claimed is:

1. A method for controlling fungus disease on vegetation which comprises applying to said vegetation a fine spray of a mineral oil having a viscosity between about 50 and 175 SSU at 100° F. and an aromatics content below about 15% by weight, a specific gravity in the range of 0.849 to 0.879, and boiling in the range of 286° to 548° F. at 10 mm.

2. A method in accordance with claim 1 wherein said mineral oil has a viscosity between about 70 to 120 SSU at 100° F.

3. A method in accordance with claim 1 which comprises spraying said oil on said vegetation at the rate of 0.25 to 4 gallons per acre.

4. A method for controlling Sigatoka fungus infection on banana plants which comprises spraying a mist consisting essentially of an oil on the leaves of said banana plants, said oil boiling in the range of 286° to 548° F. at 10 mm., having a viscosity between 50 and 175 SSU at 100° F. and an aromatics content below about 15% by weight.

5. A method in accordance with claim 4 wherein said oil has a viscosity of 70–120 SSU.

6. A method in accordance with claim 5 wherein said oil is applied at a rate between 0.25–4 gallons per acre.

7. A method for controlling Sigatoka fungus infection on banana plants which comprises spraying a mist consisting essentially of an oil boiling in the range of 286° to 548° F. at 10 mm. on the leaves of banana plants, said oil having a viscosity between 74.03 and 88.53 SSU at 100° F., a specific gravity in the range of 0.849 to 0.879, and an aromatics content below about 15% by weight.

References Cited in the file of this patent

UNITED STATES PATENTS

| 1,910,684 | Farrar | May 23, 1933 |
| 1,996,692 | Piotrowski | Apr. 2, 1935 |
| 2,144,260 | Hampton | Jan. 17, 1939 |
| 2,183,781 | Bray | Dec. 19, 1939 |
| 2,405,775 | Bradley | Aug. 13, 1946 |
| 2,570,023 | Carlson | Oct. 2, 1951 |

OTHER REFERENCES

Frear: Chem. of Insecticides, Fungicides and Herbicides, 2nd ed., 1948, pp. 189–208, D. Van Nostrand.